United States Patent Office 3,078,302
Patented Feb. 19, 1963

3,078,302
PRODUCTION OF DIALKYL FUMARATES
John E. Franz, Crestwood, and Martin W. Farrar, Webster Groves, Mo., assignors to Monsanto Chemical Company, St. Louis, Mo., a corporation of Delaware
No Drawing. Filed Sept. 25, 1958, Ser. No. 763,161
14 Claims. (Cl. 260—485)

This invention relates to a method for directly producing dialkyl fumarates, where the alkyl groups contain from 4 to 12 carbon atoms, by a hydrogen halide catalyzed reaction of an alkyl acid maleate and an alkanol. The method of this invention makes it possible to produce dialkyl fumarates directly from an alkanol and maleic anhydride.

One of the more important dialkyl fumarates is dibutyl fumarate, which is used as a monomer for copolymerization with other reactive monomers like vinyl chloride to provide synthetic resins. Transparent, colorless films made from these resins are used extensively for food packages where it is desired to display the wrapped product while at the same time preventing oxidative deterioration. Obviously, in such applications, the purity and color of the dibutyl fumarate used is very critical. The necessity for the absence of color exists in other applications of dialkyl fumarates, for example, as plasticizers for synthetic resins and also in other uses of dibutyl fumarate resins, such as resins for lacquers and resins for use in the textile sizing of cotton broadcloth.

Known processes for the production of dialkyl fumarates involve the separate steps of forming dialkyl maleate from an alkanol and maleic anhydride, separation and purification of intermediate dialkyl maleate, followed by isomerization, in the presence of a catalyst, of the intermediate maleate to the dialkyl fumarate. Alternatively, maleic acid can be isomerized to fumaric acid, which in turn can be purified and then esterified with an alkanol to produce a dialkyl fumarate.

In the practice of a prior art method, if isomerization of the intermediate dialkyl maleate is attempted without separation from the reaction mass wherein it is produced, the resulting dialkyl fumarate is of a color which renders it unsuitable for use in applications where a colorless product is required unless it is thereafter subjected to refinement such as by vacuum distillation.

It is an object of this invention to provide a process wherein, in a single step, the necessary esterification and isomerization reactions are effected in a hydrogen halide catalyzed reaction of alkyl acid maleate with an alkanol containing 4 to 12 carbon atoms.

It is an object of this invention to provide a process for producing, in high yields, a high quality, essentially colorless dialkyl fumarate directly in one step by the reaction of an alkanol and maleic anhydride without isolation and refinement of intermediate dialkyl maleate or intermediate fumaric acid.

According to the present invention, an alkanol having 4 to 12 carbon atoms and an alkyl acid maleate are heated in the presence of hydrogen halide to produce directly dialkyl fumarate. The method of this invention has many advantages over known methods, in that it is not necessary to separate and refine the intermediate maleate to produce high-quality dialkyl fumarate in high yields. By the method of this invention, essentially colorless dialkyl fumarate is produced in high yields without isolation and purification of dialkyl maleate and subsequent refining thereof.

The advantages of this invention can be realized by charging an alkanol, maleic anhydride and hydrogen halide to a suitable reaction vessel, and thereafter permitting the several reactions to take place to form dialkyl fumarate, or by charging an alkanol and maleic anhydride, forming an alkyl half ester of maleic acid, then charging hydrogen halide and thereafter forming dialkyl fumarate by heating the mixture. For purposes of this invention, starting materials composed of an alkanol and maleic anhydride or an alkanol and alkyl acid maleate are considered equiavlents, as maleic anhydride reacts readily with the alkanols to form alkyl acid maleates, i.e., half esters. The temperature of the reaction mass is maintained within the range of about 100° C. to 175° C.; preferably, the temperature should be from about 110° C. to 140° C. in order to secure maximum yields of a high-quality product within a reasonable time. Thus, temperatures below 110° C., though operable, require longer periods to complete the reaction, whereas temperatures above 140° C. cause darkening of the product. In general, we have found that it is desirable to maintain the reaction conditions such that unreacted alkanol is constantly refluxing. In order to maintain such conditions, the use of reduced pressures may be necessary in order to maintain the reaction mass within the above preferred temperature range. By maintaining reflux, water of reaction can be easily removed and, at the same time, the maximum reaction rate suitable for forming a high-quality product is maintained.

We have also found, surprisingly, that when the alkanols having 1 to 3 carbon atoms, such as methanol, are used instead of an alkanol containing from 4 to 12 carbon atoms, the yield of final product, as dimethyl fumarate, is considerably lower than the almost quantitative yields of di($C_4$–$C_{12}$ alkyl) fumarates which are obtained by our method.

As a comparison of the quality of dialkyl fumarate produced by the method of this invention, as opposed to that of dialkyl fumarate produced by isomerization of dialkyl maleate without separation and purification thereof, an average APHA color for dibutyl fumarate produced on a commercial scale by the method of our invention (a) and dibutyl fumarate produced on a commercial scale by the isomerization of dibutyl maleate without separation from its reaction mass (b) is shown in the table below:

| Source of dibutyl fumarate: | APHA |
|---|---|
| (a) | 15 |
| (b) | 75 |

Another distinct advantage of the method of this invention is that the time required to produce dialkyl fumarate is reduced to almost half of the time heretofore required. Thus, in a prior art method, alkanol and maleic anhydride are reacted to form crude dialkyl maleate which is then purified, generally by being successively washed with aqueous sodium carbonate and water, steamed to remove excess alcohol, and again successively washed with aqueous sodium carbonate and water (a procedure usually followed in purifying esters). After purification, dialkyl maleate is dehydrated under reduced pressure, followed by isomerization, in the presence of a suitable catalyst, to dialkyl fumarate. After isomerization, it is necessary to subject dialkyl fumarate to successive sodium carbonate and water washes, followed by dehydration, in order to produce a high-quality product. Now, by our method, the necessity of purifying dialkyl maleate is absented, and there is thus eliminated a costly and time-consuming procedure, especially for a commercial process.

The hydrogen halide catalyst can be added to the reaction mixture or can be formed in situ from compounds known to the art, such as hydroiodic acid, hydrobromic acid, hydrochloric acid, hydrofluoric acid, thionyl chloride, thionyl bromide, phosphorus oxychloride, phosphorus oxyfluoride, phosphorus oxybromide, phosphorus oxyiodide, phosphorus triiodide, phosphorus trichloride, chlorosulfonic acid, sulfur dichloride, sulfuryl chloride, sulfuryl fluoride, etc.

Preferably, a catalyst combination of hydrogen halide and sulfuric acid is used in order to minimize loss of hydrogen halide as the reaction proceeds, thus permitting the use of a smaller amount of the more expensive hydrogen halide than when only hydrogen halide is used. Regardless of whether hydrogen halide alone or hydrogen halide and sulfuric acid is used as catalyst in the method of this invention, there can be obtained, in high yields, a dialkyl fumarate of very high quality.

The amount of hydrogen halide which is employed is generally up to about 0.2 mol per mol of alkyl acid maleate or maleic anhydride; however, from about 0.01 to 0.05 mol per mol of alkyl acid maleate or maleic anhydride is generally satisfactory. The hydrogen halide can be added as the hydrogen halide or as a source which can produce the required amount of hydrogen halide under the reaction conditions of this method. Thus, for example, if a hydrogen chloride source such as thionyl chloride is added, it is added in an amount which can generate the required quantity of hydrogen chloride.

When a small quantity of sulfuric acid is employed together with the hydrogen halide, it is necessary to use only a catalytic quantity of sulfuric acid; generally, 0.001 to 0.005 mol per mol of alkyl acid maleate or maleic anhydride is adequate.

It is generally advantageous to use a slight excess of alkanol in order to obtain maximum yields of dialkyl fumarate. Examples of suitable alcohols are butyl, isobutyl, amyl, n-hexyl, dimethylbutyl, n-heptyl, n-octyl, iso-octyl, 2-ethylhexyl, nonyl, n-decyl, iso-decyl and dodecyl alcohol, which alcohols can be obtained from various sources, a desirable example of which is the oxo process.

Details of our invention will be further evidenced by reference to the following non-limiting examples. Parts are in parts by weight.

*Example 1*

To a suitable reaction vessel there were charged 96 parts of maleic anhydride, 153 parts of n-butyl alcohol, 0.2 part 96% sulfuric acid and 3.0 parts of hydrochloric acid (containing about 27% by weight hydrogen chloride). The mixture was heated, with stirring, over a period of about three hours at temperatures of from about 110° C. to 140° C. under reflux conditions. Before returning condensed n-butyl alcohol to the reaction mass, water was constantly removed by separation from condensed butyl alcohol-water azeotrope. After about the first hour, the pressure within the reaction vessel was lowered in order to maintain a high reaction rate. After the heating period, unreacted butyl alcohol was removed at about 100–110° C. under reduced pressure. The crude reaction product was washed with aqueous sodium carbonate at 80° C. and then washed with three 50 ml. portions of water at 80° C. Thereafter, the product was dried at 100° C. under reduced pressure and filtered. The product, 223 parts of dibutyl fumarate (corresponding to a yield of 99%), had a color corresponding to an APHA color of 15 and a crystallizing point of −19.2° C., clearly showing the high yields and high quality which can be obtained by the method of this invention.

*Example 2*

The procedure of Example 1 was repeated, except that 1.6 parts of thionyl chloride were added in place of hydrochloric acid. By this procedure, there were recovered 221 parts of dibutyl fumarate having a crystallizing point of −18.8° C., corresponding to a yield of 98%.

*Example 3*

The procedure of Example 1 was repeated using hydroiodic acid in place of hydrochloric acid, to yield essentially the same results as obtained in Example 1.

*Example 4*

To a suitable reaction vessel there were charged about 302 parts of 2-ethylhexanol, 97 parts of maleic anhydride, about 4 parts of hydrochloric acid (about 27% by weight hydrogen chloride) and about 0.18 part of sulfuric acid. The mixture was heated to about 122° C., held at that temperature for about 12 minutes, and then heated to about 147° C. and held at that temperature for about 4 hours. The reaction vessel was then evacuated and unreacted alcohol removed by distillation. The reaction product was steamed for about 2 hours at about 100° C. and 300 mm. of mercury total pressure and then dried. Infrared analysis of the reaction product, which had a specific gravity of 0.9386, showed it to be essentially pure di-2-ethylhexyl fumarate. The amount of di-2-ethylhexyl fumarate recovered was essentially stoichiometric.

In like manner, other hydrogen halides can be utilized to prepare dialkyl fumarate of high purity in high yields.

Another advantage resulting from utilizing the method of our invention is that the copolymerization rate of dialkyl fumarate produced according to our method is very high and is equal to the copolymerization rate of dialkyl fumarate produced from good quality, highly refined fumaric acid; whereas, by other methods known to the art, as, for example, a method wherein piperidine is used to isomerize dialkyl maleate to dialkyl fumarate, the copolymerization rate is greatly reduced. As a comparative measure of the copolymerization rate of the products obtained from the process of our invention, dibutyl fumarate prepared in several ways was copolymerized with vinyl acetate, generally following the procedure set forth in an article by J. F. Palmer and R. A. Cass in the Official Digest, Federation of Paint and Varnish Production Clubs, vol. 28, No. 381, p. 869 (1956), and the following results were observed:

| Source of dibutyl fumarate: | Time for Polymerization in minutes |
|---|---|
| Highly refined fumaric acid and butanol | 85 |
| Maleic anhydride and butanol following the teachings of our invention | 85 |
| Piperidine isomerized dibutyl maleate | 300 |

A severe reduction in the copolymerization rate of dialkyl fumarates is also experienced when mercaptans and similar thiol compounds are used to isomerize dialkyl maleate to dialkyl fumarate, because it is almost impossible, especially on a commercial scale, to completely remove these thiols, yet in trace amounts they act as polymerization regulators or modifiers.

In retrospect, it should be noted that a fast polymerization rate is most desirable, since it is thereby possible to produce polymers having a small chain length of the order of 0.1 micron, as opposed to chain lengths of 1 to 10 microns which result from slow polymerization. These extremely short polymers are desired, since they result in a copolymerization product having a small particle size which, in turn, allows more complete coalescing of a copolymer when applied to a surface and thus gives a more uniform film on said surface.

From the above, it is seen that our invention provides a superior process for commercially producing dialkyl fumarate in high yields.

What is claimed is:

1. In a process for producing a dialkyl fumarate, the steps comprising reacting an alkanol containing 4 to 12 carbon atoms and an alkyl acid maleate in the presence of hydrogen halide, the alkyl group of said maleate having 4 to 12 carbon atoms, thereby directly forming dialkyl fumarate, and thereafter recovering said dialkyl fumarate.

2. In a process for producing a dialkyl fumarate, the steps comprising reacting, at temperatures of from about 100° C. to about 175° C., an alkanol containing 4 to 12 carbon atoms and an alkyl acid maleate in the presence of hydrogen chloride, the alkyl group of said maleate having 4 to 12 carbon atoms thereby directly forming dialkyl fumarate, and thereafter recovering said dialkyl fumarate.

3. In a process for producing a dialkyl fumarate, the steps comprising reacting about 2 mol proportions of an alkanol containing 4 to 12 carbon atoms with one mol proportion of maleic anhydride in the presence of hydrogen halide, thereby directly forming dialkyl fumarate, and thereafter recovering said dialkyl fumarate.

4. In a process for producing a dialkyl fumarate, the steps comprising reacting, at temperatures up to about 175° C., about 2 mol proportions of an alkanol containing 4 to 12 carbon atoms with one mol proportion of maleic anhydride in the presence of hydrogen chloride, thereby directly forming dialkyl fumarate, and thereafter recovering said dialkyl fumarate.

5. In a process for producing a butyl alkyl fumarate, the steps comprising reacting butanol and an alkyl acid maleate in the presence of hydrogen halide, the alkyl group of said maleate having 4 to 12 carbon atoms, thereby directly forming butyl alkyl fumarate, and thereafter recovering said butyl alkyl fumarate.

6. A process of claim 5 where the alkyl acid maleate is butyl acid maleate.

7. In a process for producing dibutyl fumarate, the steps comprising reacting, at temperatures of from about 100° C. to about 175° C., butanol and butyl acid maleate in the presence of hydrogen chloride, thereby directly forming dibutyl fumarate, and thereafter recovering said dibutyl fumarate.

8. In a process for producing dibutyl fumarate, the steps comprising reacting about 2 mol proportions of butanol with one mol proportion of maleic anhydride in the presence of hydrogen halide, thereby directly forming dibutyl fumarate, and thereafter recovering said dibutyl fumarate.

9. In a process of producing dibutyl fumarate, the steps comprising reacting, at temperatures of from about 100° C. to about 175° C., about 2 mol proportions of butanol with one mol proportion of maleic anhydride in the presence of hydrogen chloride, thereby directly forming dibutyl fumarate, and thereafter recovering said dibutyl fumarate.

10. In a process for producing di-2-ethylhexyl fumarate, the steps comprising reaction, at temperatures of from about 100° C. to about 175° C., 2-ethylhexanol and an alkyl acid maleate in the presence of hydrogen chloride, thereby directly forming di-2-ethylhexyl fumarate, and thereafter recovering said di-2-ethylhexyl fumarate.

11. A process of claim 1 where the hydrogen halide is present in an amount up to about 0.1 mol per mol of alkyl acid maleate.

12. In a process for producing a dialkyl fumarate, the steps comprising reacting, at temperatures of from about 100° C. to about 175° C., an alkanol having 4 to 12 carbon atoms and an alkyl acid maleate in the presence of hydrogen halide and a catalytic amount of sulfuric acid, the alkyl group of said maleate having 4 to 12 carbon atoms thereby directly forming dialkyl fumarate, and thereafter recovering said dialkyl fumarate.

13. A process of claim 12 where the hydrogen halide is hydrogen chloride and is present in an amount up to about 0.2 mol per mol of alkyl acid maleate.

14. In a process for producing a decyl alkyl fumarate, the steps comprising reacting decyl alcohol and an alkyl acid maleate in the presence of a hydrogen halide, the alkyl group of said maleate having 4 to 12 carbon atoms, thereby directly forming decyle alkyl fumarate, and thereafter recovering said decyl alkyl fumarate.

References Cited in the file of this patent

UNITED STATES PATENTS 2,544,692  Kugler et al. _____ Mar. 13, 1951

OTHER REFERENCES

Clemo et al.: J. Chem. Soc., London, 1930, 215.
Mayo et al.: Chem. Rev. 27, 403–407 (1940).
Adickes, J. prakt. Chem. 161, 275 (1943).
Wheland: "Advanced Organic Chemistry," 2nd edition, 1949, pgs. 306–315.
Fuson: "Advanced Organic Chemistry," 1950, pages 82–83.
Whitmore: "Organic Chemistry," second edition, 1951, page 391.
Wagner et al.: "Synthetic Organic Chemistry," 1953, pages 480–482.